(No Model.) 9 Sheets—Sheet 1.

W. D. DOREMUS.
STATION INDICATOR.

No. 361,146. Patented Apr. 12, 1887.

Witnesses:
Chas. J. Williamson
Henry C. Hazard

Inventor:
Willard D. Doremus (No Model.) 9 Sheets—Sheet 2.

W. D. DOREMUS.
STATION INDICATOR.

No. 361,146. Patented Apr. 12, 1887.

Witnesses
Chas. J. Williamson.
Henry C. Hazard.

Inventor
Willard D. Doremus (No Model.)

9 Sheets—Sheet 3.

W. D. DOREMUS.
STATION INDICATOR.

No. 361,146. Patented Apr. 12, 1887.

Witnesses:
Chas. J. Williamson
Henry C. Hazard.

Inventor:
Willard D. Doremus (No Model.)  9 Sheets—Sheet 4.

W. D. DOREMUS.
STATION INDICATOR.

No. 361,146. Patented Apr. 12, 1887.

Witnesses:
Chas. J. Williamson.
Henry C. Hazard.

Inventor:
Willard D. Doremus (No Model.) 9 Sheets—Sheet 6.
W. D. DOREMUS.
STATION INDICATOR.

No. 361,146. Patented Apr. 12, 1887.

Witnesses:
Chas. J. Williamson
Henry C. Hazard.

Inventor
Willard D. Doremus (No Model.) 9 Sheets—Sheet 7.

W. D. DOREMUS.
STATION INDICATOR.

No. 361,146. Patented Apr. 12, 1887.

Witnesses:
Chas. J. Williamson.
Henry C. Hazard.

Inventor:
Willard D. Doremus (No Model.)
9 Sheets—Sheet 8.

W. D. DOREMUS.
STATION INDICATOR.

No. 361,146. Patented Apr. 12, 1887.

Witnesses
Chas. J. Williamson
Henry C. Hazard.

Inventor:
Willard D. Doremus (No Model.) 9 Sheets—Sheet 9.
W. D. DOREMUS.
STATION INDICATOR.
No. 361,146. Patented Apr. 12, 1887.
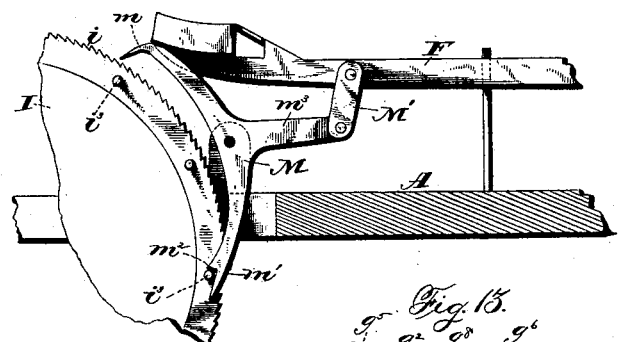
Fig. 11.
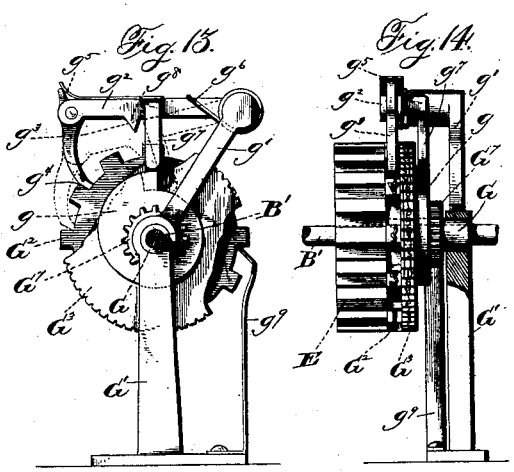
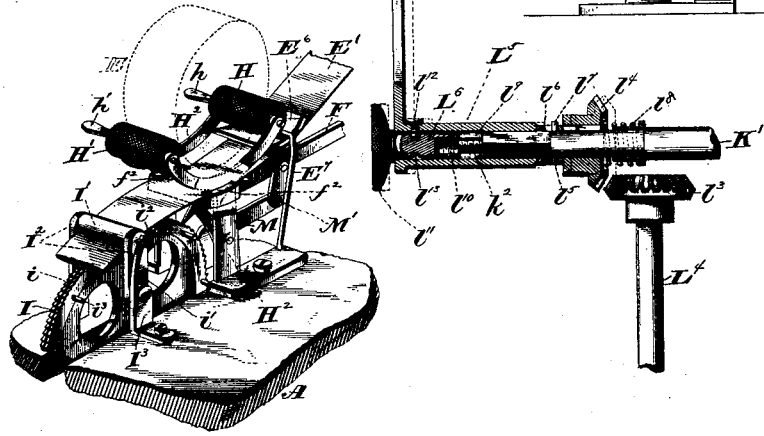
Witnesses:
Chas. J. Williamson
Henry C. Hazard
Inventor:
Willard D. Doremus

UNITED STATES PATENT OFFICE.

WILLARD D. DOREMUS, OF WASHINGTON, DISTRICT OF COLUMBIA, ASSIGNOR TO FRANK H. HURD, TRUSTEE, OF TOLEDO, OHIO.

STATION-INDICATOR.

SPECIFICATION forming part of Letters Patent No. 361,146, dated April 12, 1887.

Application filed December 8, 1886. Serial No. 221,003. (No model.)

*To all whom it may concern:*

Be it known that I, WILLARD D. DOREMUS, of Washington, in the District of Columbia, have invented certain Improvements in Station-Indicators; and I do hereby declare that the following is a full, clear, and exact description thereof, reference being had to the accompanying drawings, in which—

Figure 1:
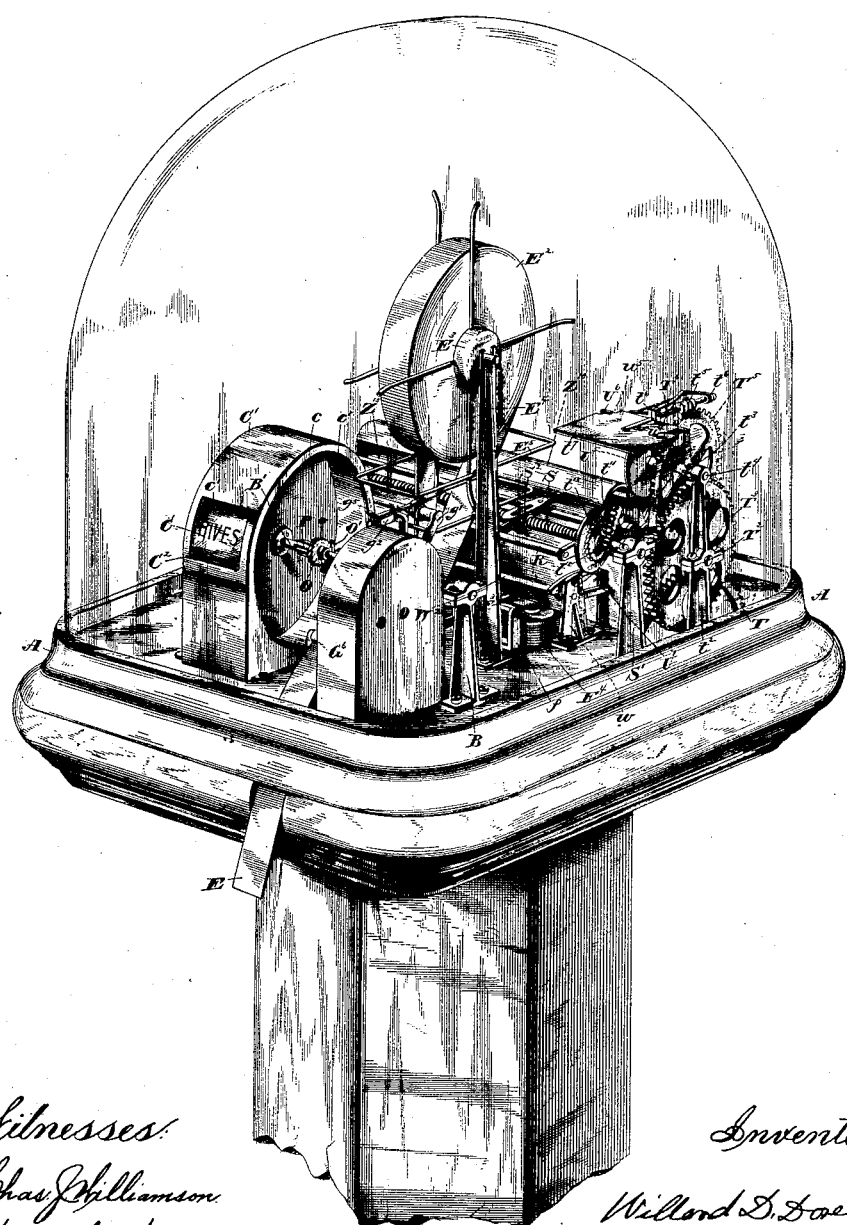
Figure 2:
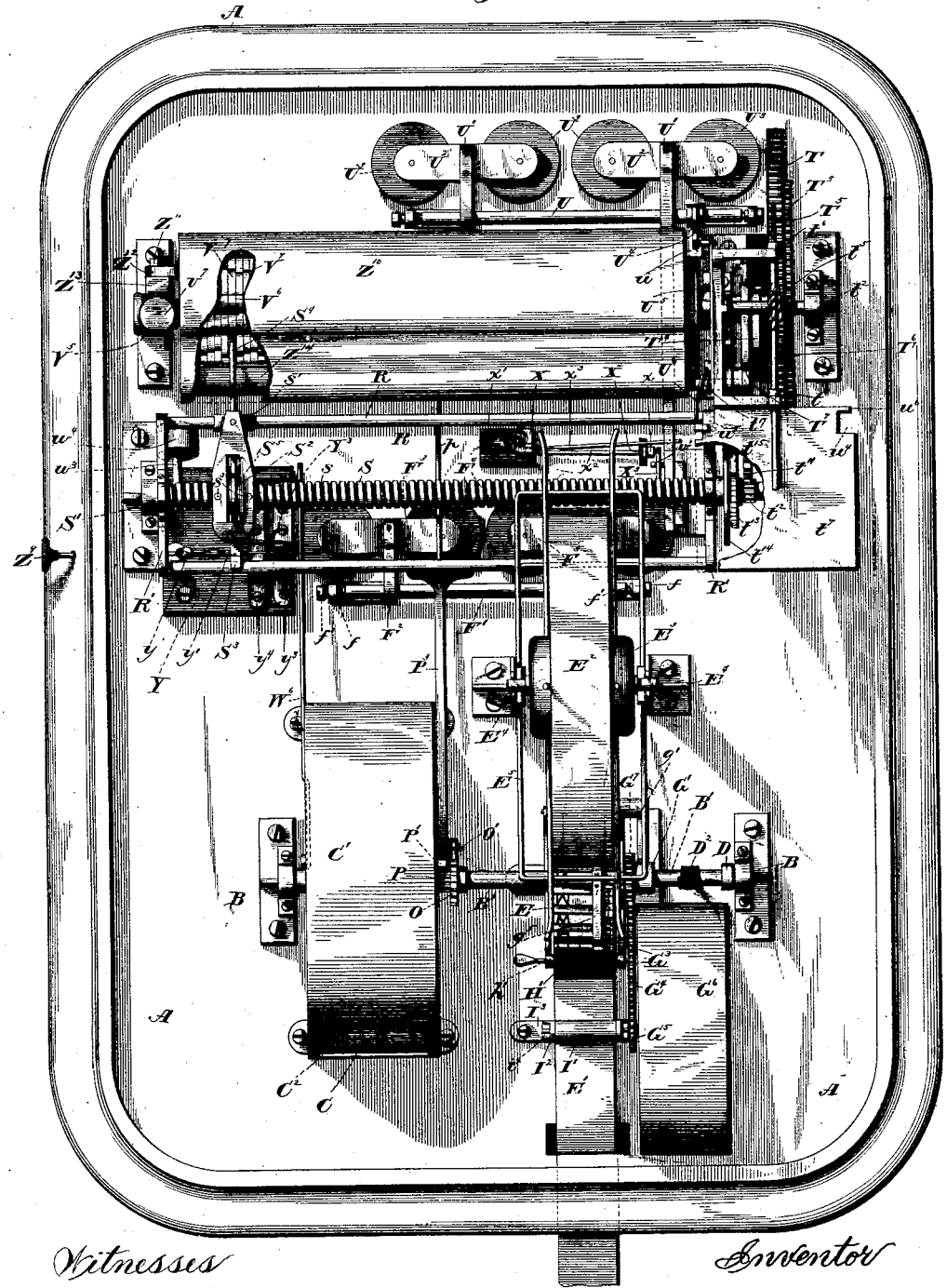
Figure 3:
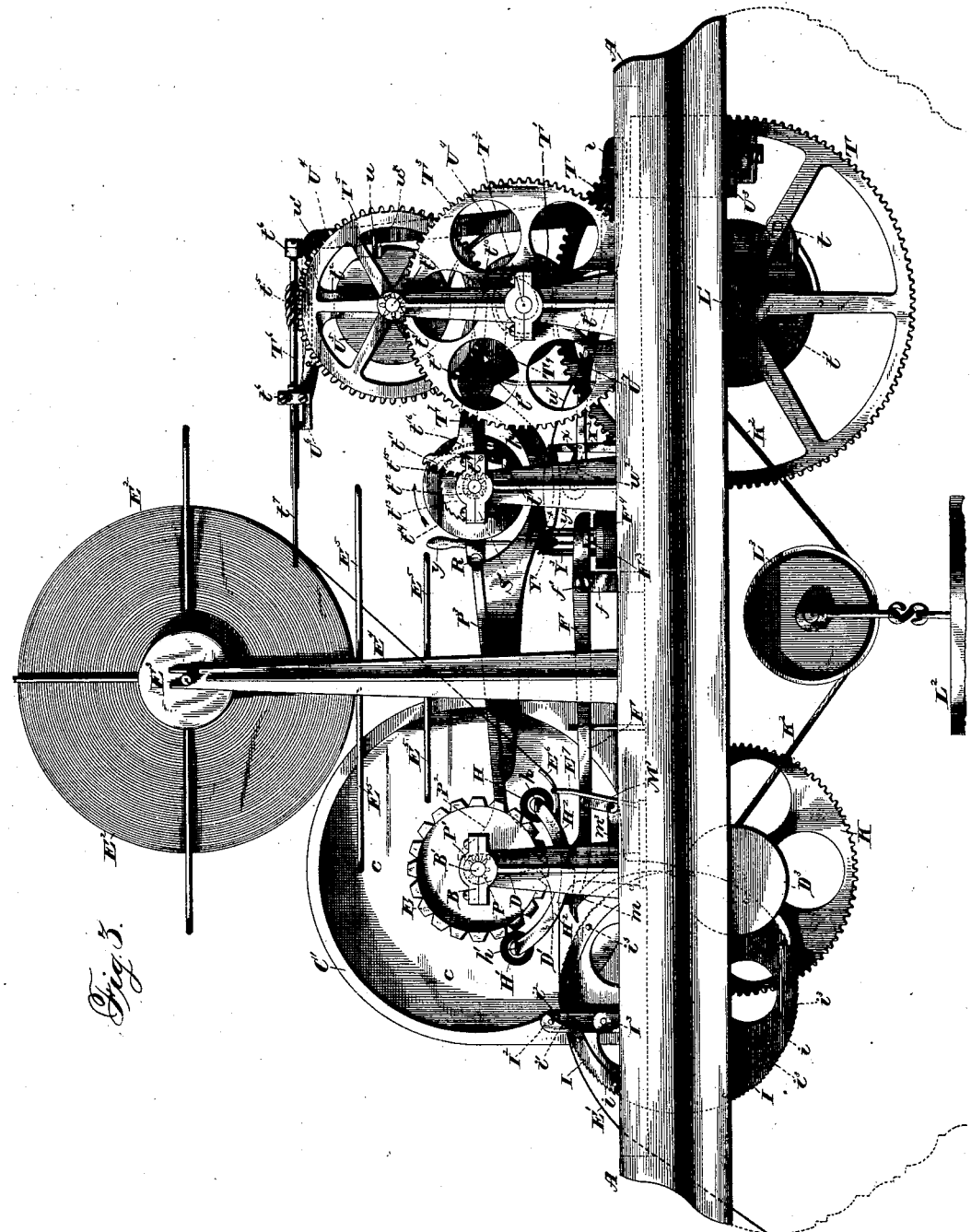
Figure 4:
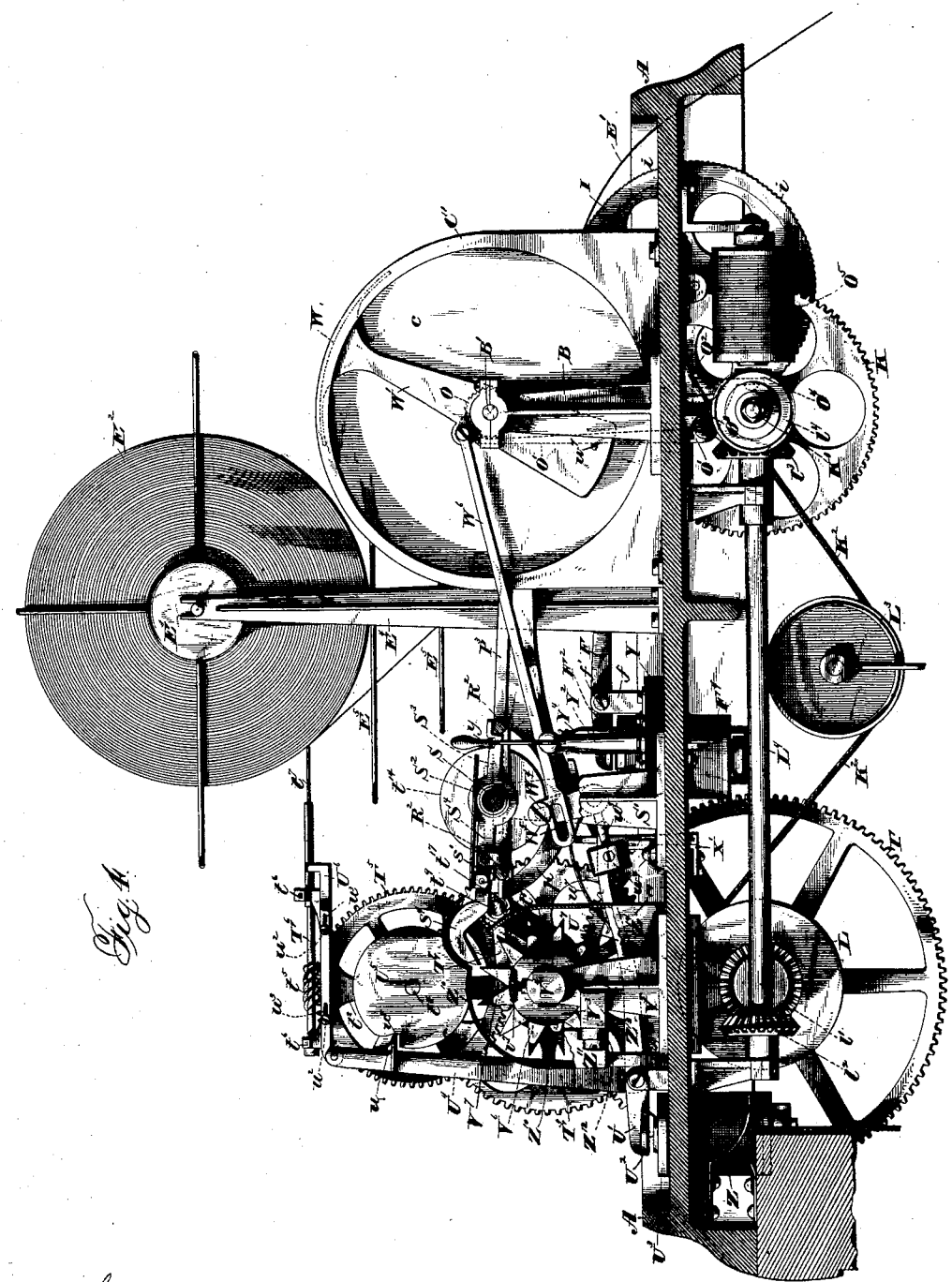
Figure 5:
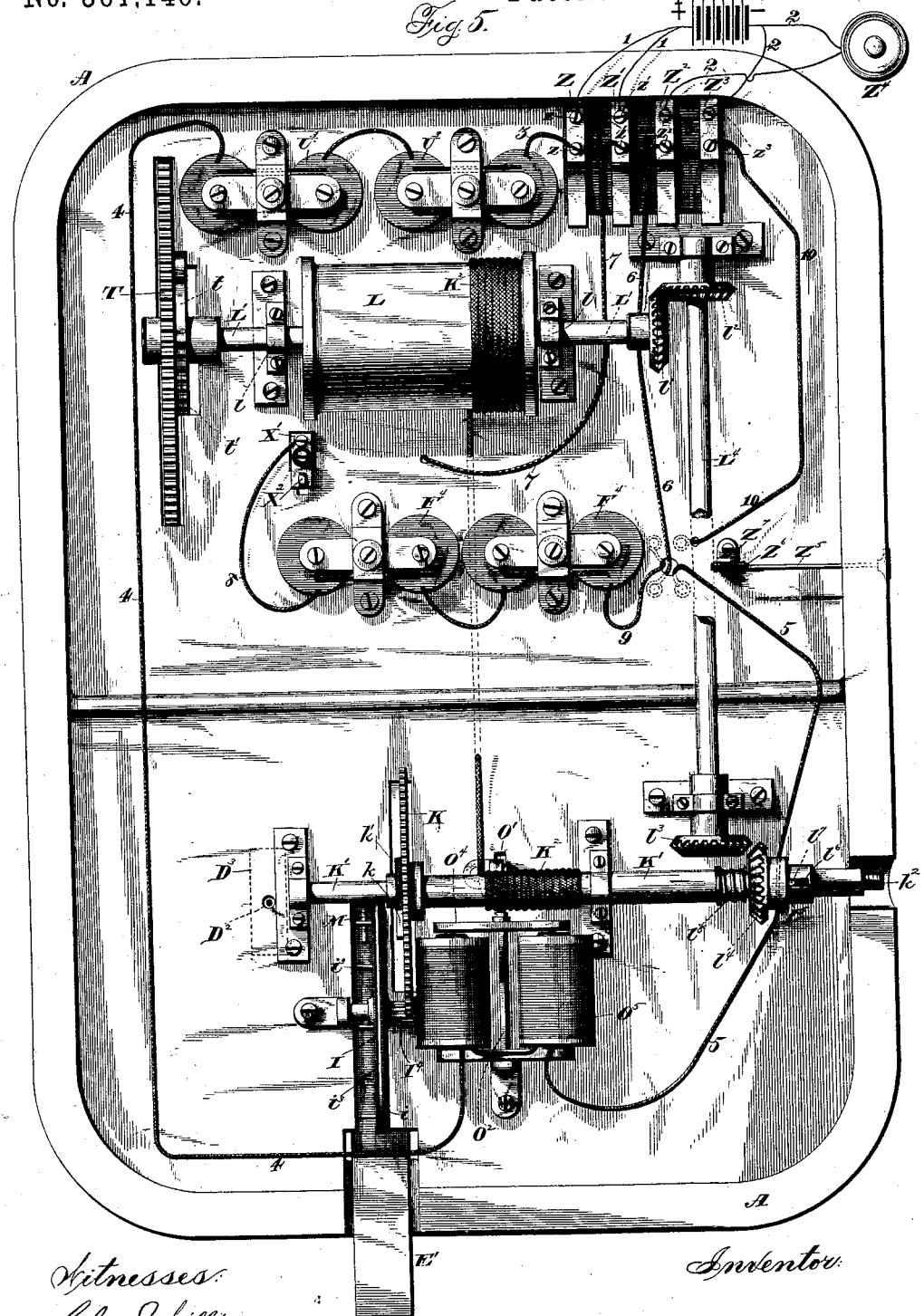
Figure 6:
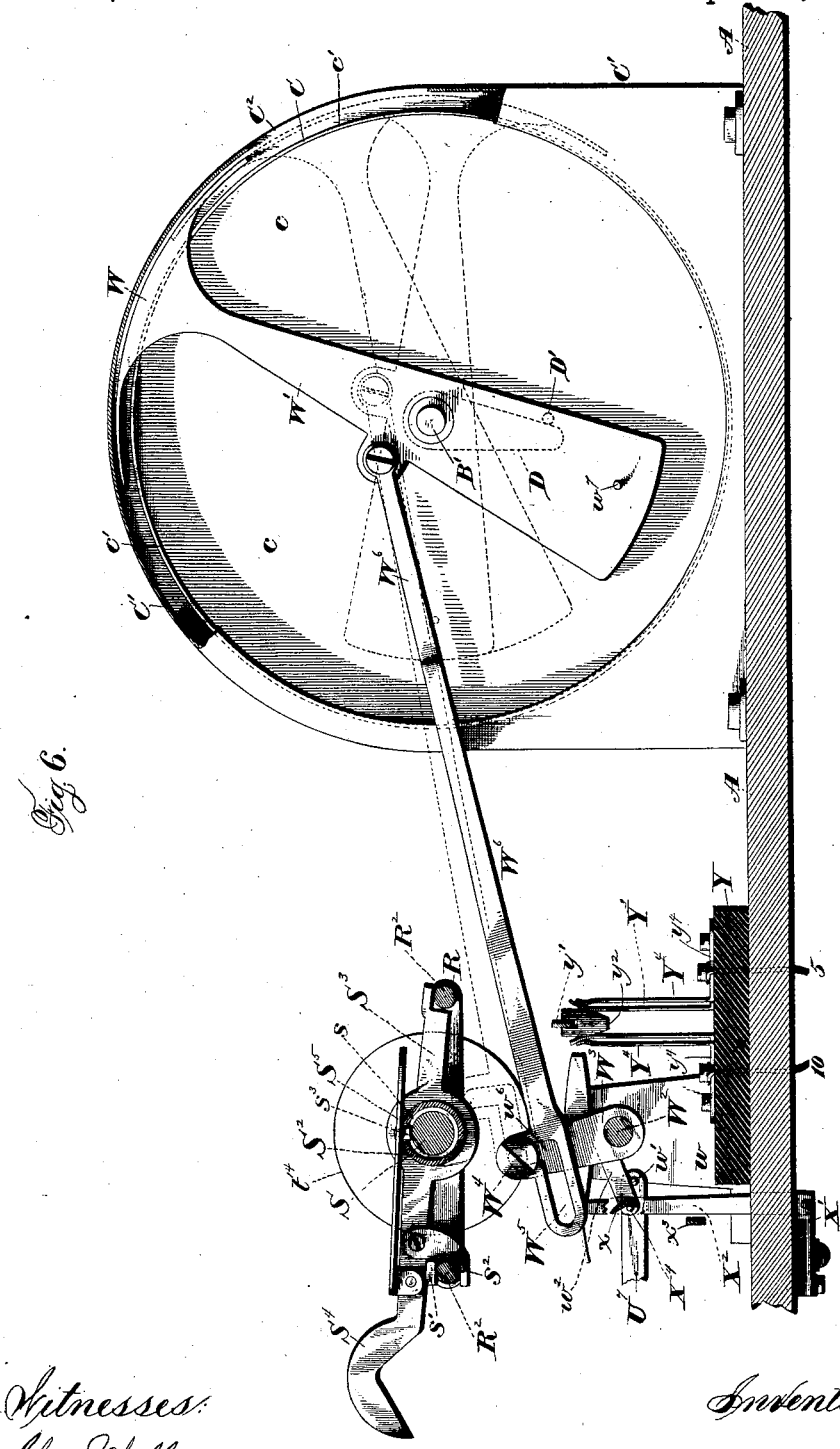
Figure 7:
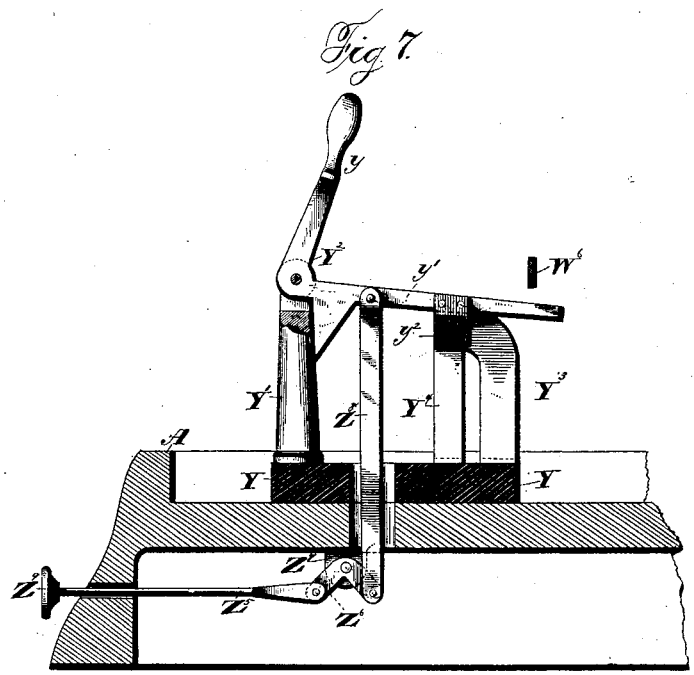
Figure 8:
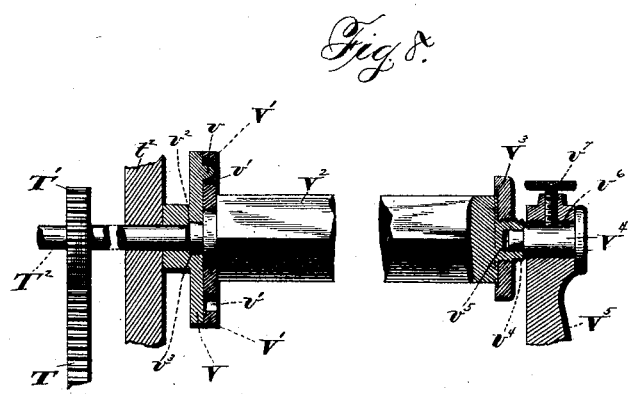
Figure 9:
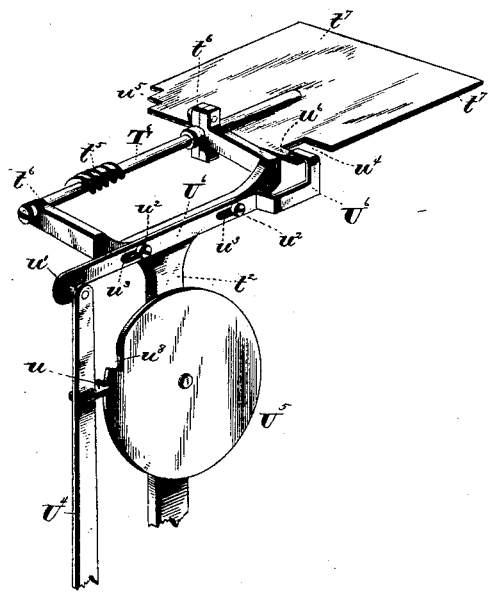
Figure 10:
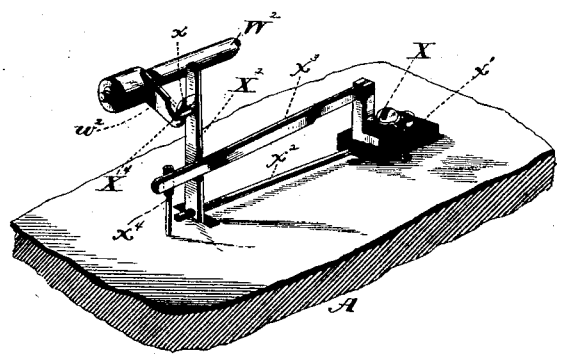

Figure 1 shows a perspective view of my apparatus; Fig. 2, a plan view of the same; Fig. 3, a view in side elevation; Fig. 4, a similar view, but from the opposite side; Fig. 5, a bottom plan view; Fig. 6, a detail enlarged view showing the shutter-operating mechanism in side elevation; Fig. 7, a similar view of the switch or cut-out devices; Fig. 8, a detail view of the disk-carrying shaft and its bearings; Fig. 9, a detail perspective view of the starting and stopping devices; Fig. 10, a similar view of the contact devices for the printing-circuit; Fig. 11, a detail view in elevation of the printing-lever and feed-regulating mechanism; Fig. 12, a detail sectional view of the winding mechanism; Fig. 13, a detail view in side elevation of the time-printing devices; Fig. 14, a similar view of the same in front elevation, and Fig. 15 a detail perspective view of the ribbon-feeding and printing devices.

Letters of like name and kind refer to like parts in each of the figures.

In the drawings, A designates the base or platform upon which the mechanism of my apparatus is supported. It can be of brass, iron, or other desired material, and be in turn supported upon any desired form of standard or bracket. The mechanism can be inclosed by any kind of covering or casing, in which is a suitable display-opening for allowing to be seen the names or marks on the indicating-drum, to be hereinafter described.

Journaled in standards B B on the base or platform A, near the front end thereof, is the shaft B', upon which is carried the indicator-drum C, upon which are marked the names or other indicating-marks to be displayed in turn by the apparatus. The drum is fixed to the shaft, so as to turn with it, and is inclosed by the casing C', having in its front side the display-opening $C^2$. I prefer to make the drum as shown—that is, consisting of the plate or disk $c$, attached to shaft C, and the cylinder $c'$, surrounding and attached to the disk portion; but I do not limit myself to such construction.

The casing C' need not inclose entirely the sides of the drum, but can be made, as shown, simply to cover the periphery or outer face of the drum, and also the edges or sides of the cylindrical portion thereof.

To stop the drum at its starting-point when it is turned backward, and also when it has reached the end of one revolution, I provide the shaft with an arm, D, close to one of the journal-standards B, and place on such standard the stop-pin D', adapted to engage the arm. To turn the drum backward to its starting-point when it has been turned forward and released by the mechanism to be hereinafter described, the cord $D^2$ is wound on the shaft C and the weight $D^3$ is attached to the cord.

On shaft B' is also fixed the printing-wheel E, for printing on the strip or ribbon E' the initials or other marks corresponding with the indicating names or marks on the drum. The wheel is for this purpose provided with type or printing devices arranged in the same order as the names on the drum, so that as a name is brought to the display-opening $C^2$ by the rotation of the drum the type for marking the initial or initials of such name or marks corresponding with the indication of the drum will be on the under side of the wheel over the striking end of the printing-lever F, to be described more fully, together with its actuating mechanism.

In order to print on the tape or ribbon E' the time at which any indication is made, I provide a sleeve, G, attached to standard G' and surrounding a portion of the shaft C, and on this stationary sleeve, close to and concentric with the type-wheel, I journal the two time-printing wheels $G^2$ $G^3$, the former being the hour and the latter the minute-wheel. These wheels are of the same diameter as the wheel E, and are provided around their peripheries with suitable type for printing the hours and minutes, respectively. The minute-wheel has type for printing each successive minute, and the hour-wheel for printing the hour-numbers up to twelve. The minute-wheel is turned continuously by means of a gear-wheel, $G^4$, as shown, driven by the pinion $G^5$ on the minute-arbor of the clock mechanism, (indicated at $G^6$,) and meshing with the pinion $G^7$, attached to or rigidly connected with the said minute-wheel. If the hour-printing wheel were to be revolved continuously, its motion would be so slow that when an indication were made and a printing operation performed the type necessary to print the hour-mark might not be properly in line with or opposite the striking end of the printing-lever. There would then be either no printing of the hour-mark, or it might be confused and indistinct. It is necessary, therefore, that the hour-wheel should remain stationary until an hour is up, and then be turned quickly to bring the next hour-type around into printing position. The marks on the minute-wheel are so close together that no such step-by-step motion is necessary for it, but it can revolve continuously, as stated.

To secure the desired step-by-step rotation or quick intermittent turning of the hour-wheel, I have provided the minute-wheel $G^3$ with the cam $g$, whose periphery runs in a spiral, the outer end of which is connected with the inner portion by an abrupt or radial face.

Pivoted to an arm, $g'$, extending upward and rearward from standard $G'$, is the lever $g^2$, carrying on its forward end the pawl $g^3$, adapted to engage the teeth $g^4 g^4$ on the hour-wheel. Such teeth have their outer surfaces provided with the type or printing means, as shown. With this construction, the spaces between the type being cut away, as shown, there is no need of a separate series of teeth for the pawl to operate upon. A small spring, $g^5$, on the lever $g^2$, serves to hold the pawl $g^3$ to its work, and a spiral spring, $g^6$, serves to force the lever downward to turn the hour-wheel.

Attached to or extending down from the pawl-lever is an arm, $g^7$, adapted to be engaged and raised by the spiral cam $g$, as indicated in the drawings, Figs. 13 and 14. The cam is so constructed with reference to the minute-wheel that its outer end passes out from under the arm $g^7$, and allows the same with the lever to drop just as the minute-wheel makes a complete sixty-minute revolution. As the lever $g^2$, thus released, is forced down by its spring $g^6$, the pawl $g^3$, engaging a tooth on the hour-wheel, revolves such wheel quickly to bring a new type-bearing tooth into printing position. To prevent any possibility of the hour-wheel being revolved too far or through more than one space at a time, the pawl-lever $g^2$ is provided with a tooth or lug, $g^8$, which, as the lever falls, drops down into the path of one of the teeth on the wheel in position to engage the front face of such tooth as the wheel is turned the proper distance by the pawl on the pawl-lever. To prevent any possibility of backward turning of the hour-wheel as the pawl-lever is raised again by the cam $g$, I provide the spring-pawl $g^9$. (Shown best in Fig. 13.)

With time-printing wheels journaled independently of but concentrically with the drum-shaft and printing-wheel E, obviously the drum can be turned forward or back to bring any name on the drum opposite the display-opening and the corresponding initial or mark on the wheel E in position for printing without affecting the motion of the time-printing wheels. The time-printing marks on these wheels will then always be in position to print at the same time that any indication is printed on the strip E' from wheel E. There will then always be alongside a mark or indication recorded on the strip a clear record of the time of such indication.

The ribbon or strip E', upon which is to be printed the mark or marks corresponding with the indications on the drum, and also the time at which such indications are to be made, is broad enough to extend across under both the time-printing wheels and the printing-type wheel E. It is supplied from a roll, $E^2$, held in a reel, $E^3$, like those used in printing-telegraph instruments, such reel being journaled in the standards $E^4 E^4$, extending up from base A; also attached to such standards, and inclosing the path of the strip to the printing devices, are wire frames $E^5 E^5$. These of course are not absolutely necessary, and can be dispensed with, as desired, without departure from my invention. From the reel the strip passes downward and forward under a curved guide-plate, $E^6$, supported on the short standard $E^7$. This plate, while serving to guide the strip down under the printing-wheels, also serves as a guard to keep the strip out of contact with the inking-roller H, which inks the types on the several wheels as the latter rotate. A second corresponding inking-roller, H', is in contact with the several printing-wheels on their forward sides. These rollers, which can be of the ordinary construction and material used for such purpose, are journaled on rods or short shafts $h h'$, which pass through the rollers and are supported on the arms of the V-shaped standards $H^2 H^2$, on opposite sides of the way through which the tape or ribbon travels. The roller-supporting shafts are preferably made easily removable, so that the rollers can be readily removed, inked, and returned to their places. For this purpose said shafts are provided with knobs, by which they can be drawn out longitudinally through the rollers and their bearings. After passing out to the front of the printing-wheels the tape or ribbon passes over the toothed feed-wheel I, provided with the double series of ratchet-shaped teeth $i i$, to engage and take hold of the strip. To bear the strip down upon these teeth, so that they will take a good hold of the same, I provide the pressure-roll I', journaled in the arms $I^2 I^2$, which are pivoted to the standards $I^3 I^3$, and are forced over to cause the roll to bear down on the tape by the springs $i'$ $i'$, attached to the standards and engaging pins $i^2$ $i^2$ on the arms $I^2$ $I^2$.

The wheel I, extending up through and rotating in a slot in base A, is journaled in suitable bearings on the under side of said base. Attached to or made in one piece with it is the pinion $I^4$, meshing with and driven by the gear-wheel K on shaft K'. This wheel is connected with the shaft which drives it by the pawl $k$ on the wheel and the ratchet $k'$ on the shaft in the same way as the spring or weight arbor of a clock-movement is connected with the gear-wheel to be driven by the spring. Such connection is, as is well known, for the purpose of enabling the arbor to be turned by a key to wind up the spring or weight. In the present case it is for the purpose of allowing the shaft K' to be turned to wind on it the weight-cord $K^2$. The other end of this cord is wound upon a drum, L, fixed upon shaft L', journaled in suitable bearings, $l\,l$, beneath and near the rear side of the base A. The weight $L^2$ is hung from a grooved pulley or wheel, $L^3$, which is supported upon the cord $K^2$, between the shaft K' and drum L. The stress of the one weight is thus brought to bear upon drum, and this shaft to turn them both. As but little power is needed to turn the feed-wheel, there is no drum on shaft K', and the cord is wound upon the shaft itself. For purposes to be set forth, more power is needed to turn the shaft L' with its connected gearing. The drum is therefore provided on this shaft and the weight-cord is wound on the drum. In order to make it possible to wind the weight-cord on the drum and shaft K' at the same time and by one key, I provide the drum-shaft L' with the bevel-pinion $l'$, meshing with a similar gear, $l^2$, on the rear end of counter-shaft $L^4$, journaled in suitable bearings on base A. On the forward end of this shaft is another bevel-pinion, $l^3$, close to shaft K'. On the latter shaft is the sliding bevel-gear $l^4$, adapted to be moved longitudinally on the shaft, but to turn always with the same. As a means for securing this action, I provide the gear with a hub, $l^5$, in which is the slot $l^6$, engaged by the pin $l^7$ on the shaft. I do not, however, limit myself to such construction, as any other of the well-known means for securing rotation of a wheel with a shaft, while allowing it to slide thereon, can be used. The gear $l^4$ is so situated that upon being moved inward on the shaft it will be brought into mesh with pinion $l^3$ on counter-shaft $L^4$. A spring, $l^8$, around shaft K' serves to force and hold the gear normally outward on the shaft, out of gear with said pinion $l^3$. The outer portion of shaft K' is squared or made angular, as shown, for reception of a winding-key, $L^5$. To force and keep the gear $l^4$ in mesh with pinion $l^3$ during the winding by the key, so that both the shaft K' and drum L will be revolved at the same time to wind the weight-cord on them, the outer end of the shaft has the screw or threaded portion $k^2$. The key $L^5$ is provided with the longitudinal opening $l^9$, a portion of which is angular in cross-section to fit the key, while the other portion is cylindrical. In such latter part of the opening is journaled the thumb-screw $L^6$, having in its inner end the threaded hole $l^{10}$, to engage the threaded portion $k$ of shaft K', and on its outer end the knurled head or thumb-piece $l^{11}$. A set-screw, $l^{12}$, engaging a groove, $l^{13}$, in the periphery of the thumb-screw, serves to hold such screw in the key, while allowing it to be turned freely.

With the construction of parts as described, the shafts K' and drum L are normally disconnected, so as to be capable of independent rotation by the action of the weight and cord. If, now, the key $L^5$ be placed on the squared portion of shaft K' and the thumb screw $L^6$ be caused to engage the screw on the shaft and be turned in the proper direction, the key will be drawn inward on the shaft, so that its inner end will engage the hub of gear $l^4$ and force the latter into gear with bevel-pinion $l^3$. Upon turning the key both the shaft K' and the drum will be rotated at one time. After the winding is finished the thumb-screw $L^6$ is unscrewed from the shaft K', the key is withdrawn, and the gear $l^4$ is thrown out of mesh with pinion $l^3$ by the spring $l^8$, described, leaving the shaft K' and drum-shaft again unconnected by any gear.

The feed-wheel I is provided on one side with the series of pins $i^3$ $i^3$, arranged around near the edge of the wheel, as shown best in Figs. 3 and 11. A double pawl, M, pivoted on a short standard on base A, has the two arms $m$ $m'$, adapted to alternately engage the pins $i^3$ $i^3$ as the pawl is rocked on its pivot. The upper arm, $m$, is shaped so as to engage the forward side of the pins and stop the rotation of the feed-wheel when the pawl is rocked to carry such arm forward. The lower arm, $m'$, is provided with a shoulder, $m^2$, which is brought into the track of the pins on the feed-wheel when the pawl is swung to withdraw the upper pawl-arm, $m$, as shown in Fig. 11. With this construction, and with the parts as shown in Fig. 11, the wheel is held stationary against the stress of the weight exerted upon it through the connecting means hereinbefore set forth. If the pawl be now rocked to carry its upper arm, $m$, forward, such arm will engage the nearest pin $i^3$ and stop the wheel after a very slight movement thereof, while the shoulder $m^2$ on the pawl-arm $m'$ is disengaged from the pin $i^3$ below. As the pawl is now rocked in the opposite direction the upper pawl arm releases its pin, and the shoulder on the lower arm is brought inward behind the pin which it engaged before and into the track of the next pin on the wheel. Said wheel is therefore free to be turned by the weight to bring such next pin up against the shoulder $m^2$ on arm $m'$. The distance between the pins $i^3$ $i^3$ is so adjusted that the wheel will have just motion enough to feed the record tape or ribbon the proper or required distance each time. As the feeding of such strip ought only to take place when no printing is being done, I make sure of its proper turning by connecting the pawl M with the printing-lever F itself. Said pawl is provided with an arm, $m^3$, which is connected with the lever by means of the link M', so that as the lever rises to bring the tape or ribbon against the printing-wheels the upper arm, $m$, of the pawl is swung into engagement with a pin, $i^3$, on the feed-wheel, and as the lever falls, having completed the printing, the upper arm, $m$, is first caused to release the pin and allow the wheel to turn, and then the lower arm, $m'$, with its shoulder $m^2$, is caused to limit and stop the turning of the wheel, as described hereinbefore. This printing-lever F is, as shown in the drawings, pivotally supported in suitable ears or standards, $f f$, on the base A. To its pivot-shaft F', which is journaled at its ends in the adjustable bearing pieces or screws $f' f'$, are attached the two rearwardly-extending arms $F^2 F^2$, carrying the armatures $F^3 F^3$ for the electro-magnets $F^4 F^4$ below.

One of the armature carrying arms is shown as made in one piece with the printing-lever; but I do not limit myself to such construction; nor do I intend to limit myself to the use of two sets of arms, armatures, and magnets. One or more can be used, as desired, without departure from my invention.

The printing or striking end of the lever is made broad enough to extend across under the three type or printing wheels, and at its sides is provided, as shown in Fig. 15, with the upward and inwardly-turned lugs or lips $f^2 f^2$, engaging the sides of the record tape or strip, and also overlapping the same at its sides, to hold it down on the lever. The tape then, while free to pass over the lever end, is carried up and down to and from the printing-wheels as the lever is moved up and down. To raise the printing end of the lever at the desired times, an electrical current from battery N is sent through the magnets $F^4 F^4$ at intervals, as and by the means which will be hereinafter set forth.

On the indicator-drum shaft B', between the drum and the printing-wheel, is a ratchet-wheel, O, whose teeth $o o$ have their abrupt faces on their forward sides with reference to the direction in which the weight $D^3$, through the cord $D^2$, wound on the shaft, tends to turn the latter. A pawl-lever, O', pivoted below and extending up through the base A, has its upper end pawl-shaped to engage the teeth $o o$ and hold the wheel O, shaft B', and indicator-drum from being revolved by the weight $D^3$. A spring, $O^2$, bearing against the lower arm, $O^3$, of this lever, tends to throw and keep the upper end of the lever in engagement with the ratchet-wheel. With this construction the shaft B' and drum C are free to be rotated forward to bring the names on the drum successively opposite the display-opening $C^2$ in the drum cover or casing; but they cannot turn back until the pawl end of the pawl-lever is disengaged from said ratchet-wheel.

To actuate the lever against the stress of spring $O^2$, to disengage it from the ratchet-wheel at intervals, I provide the lower arm, $O^3$, of the lever with the armature $O^4$ and place the electro-magnets $O^5 O^5$ in position to attract such armature when an electric current is sent through them along the conductors $O^6 O^7$, connected with a battery and make-and-break device, as hereinafter described. The pawl-lever being, by the action of the magnets on the armature, disengaged from the teeth of the ratchet-wheel, the shaft B', with the indicator-drum and printing-wheels thereon, is, by the action of the weight $D^3$, rotated back to its starting-point, where it is stopped, as indicated clearly hereinbefore.

On the indicator-drum shaft B', close to the ratchet-wheel O, is fixed the pinion P, which is engaged by the teeth P' P' of the toothed segment $P^2$, carried by the vertically-swinging arm $P^3$. This arm is rigidly attached, as shown, to a rocking frame, R, pivoted at its ends upon the shaft S, extending transversely of the bed A, and itself journaled in suitable bearings in standards S' S', extending up from such bed or base. The frame is loosely pivoted on the shaft, so that each can turn freely independently of the other. Said frame consists of the two end pieces, R' R', pivoted on and extending in opposite directions from the shaft, and the two parallel rods $R^2 R^2$, connecting rigidly the corresponding ends of the end pieces. The arm $P^3$ is attached directly to the front one of these rods, and by a curved extension, $p$, passing under shaft S, is connected with the other frame-rod, $R^2$. Shaft S, between the points at which the frame R is pivoted upon it, is provided with the spiral groove $s$, forming a screw-thread.

On the grooved or threaded part of the shaft slides the sleeve $S^2$, provided with the two rigid arms $S^3 S^4$, the former extending forward from the sleeve and engaging the top of the front frame-rod, $R^2$, and the latter extending rearward over and beyond the rod $R^2$, forming the rear side of the rocking frame. This latter arm, $S^4$, is provided with the lug or piece $s'$, resting on the top of the rod $R^2$, and the lug $s^2$, extending down under and engaging the under side of said rod. With this construction the sleeve, with its arms, is, obviously, free to slide longitudinally on the shaft S and with reference to the frame R, but must rock with the latter.

As the frame is connected with the pinion P on the indicator-drum shaft by the rigid arm $P^3$, bearing the toothed segment meshing with the wheel, the indicator-drum shaft will be turned by the rocking of the frame R, the amount of its rotation being dependent upon the amount of rocking of the frame. As the sleeve $S^2$ moves rigidly with the frame as the latter rocks, the amount of turning of the indicator-drum shaft will be proportionate to the rocking of said sleeve. The indicator-drum can then be turned any desired amount to bring any desired one of the names or marks on its surface opposite the display-opening $C^2$ by rocking the sleeve, with its arms engaging the frame R, a certain distance, which can always be accurately known beforehand.

The rear end of the sleeve-arm $S^4$ is extended to the rear of the frame, and is curved upward and then downward to a point, for a purpose to be described. Attached to such arm, and extending forward over the top of the sleeve $S^2$, is the flat spring $S^5$, provided with the two pins $s^3$ $s^3$, adapted to engage the spiral groove $s$ in shaft S on opposite sides of the sleeve. With this construction the sleeve, with its arms, forming together what I term my "slide-piece," will be carried along the rocking frame as the shaft is rotated. Said shaft is not rotated continuously, but is turned at intervals, so as to move the slide-piece along with a step-by-step motion with periods of rest between the movements. The mechanism for thus intermittingly rotating the screw-shaft is as follows:

Upon the winding-drum shaft L′ is journaled the gear-wheel T, connected, as shown, with the shaft by means of the usual winding pawl and ratchet, $t$ and $t'$, so as to allow the shaft to be turned independently of the wheel to wind up the weight-cord on the drum, but to cause the wheel to turn with the shaft as the latter is turned by the action of the weight and cord. This gear-wheel T meshes with the pinion T′ on the short transverse shaft $T^2$, journaled in standards $t^2$ $t^2$ on the base A. On shaft $T^2$ and rotating therewith are also the gear-wheel $T^3$ and the spiral cam $T^4$. This wheel $T^3$ meshes with a pinion, $t^3$, on the shaft $t^4$, also journaled in standards $t^2$ $t^2$. A worm-wheel, $T^5$, fixed on this shaft has its teeth engaging the worm $t^5$ on the fly-shaft $T^6$ above and extending at right angles to shaft $t^4$. This fly-shaft is journaled in suitable bearings, $t^6$ $t^6$, supported on arms from the inner standard, $t^2$, and carries the regulating fly or fan $t^7$. Journaled in an arm, $t^8$, extending forward from this same standard, is the pivot stud or pin $t^9$, to which is attached the lever $T^7$, provided at its rear end with pin $t^{10}$, engaging the spiral cam $T^4$, and on its forward end having the toothed segment $t^{11}$, meshing with the pinion $t^{12}$, loosely journaled on an extension of bearing portion of the screw-shaft S. Rigidly connected with this pinion is the ratchet-wheel $t^{13}$, and on the shaft is fixed the disk $t^{14}$, carrying the pawl $t^{15}$, pressed by spring $t^{16}$ into engagement with the ratchet. The ratchet-teeth and pawl are so arranged, as shown in Fig. 3, as to allow the pinion and ratchet to turn independently of the shaft only in the direction shown by the arrow in such figure—that is, the direction in which the segment $t^{11}$ will turn the pinion as it descends. This descent of the segment-carrying end of the lever $T^7$, is caused by the action of the cam $T^4$ raising the pin $t^{10}$ on the rear end of the lever. The spring $t^{17}$, attached to the pivot pin or stud of the lever, acts to turn the lever quickly to carry its rear end down and front end upward as the highest part of the spiral cam passes out from under the pin $t^{10}$, thus leaving the rear end of the lever unsupported and free to fall. During the quick upward throw of the segment end of the lever, due to the action of the spring $t^{17}$, the segment rotates the screw-shaft, through the pinion and pawl-and-ratchet connection, in a direction to carry the slide-piece a certain distance to the right of its previous position. This shifting of the slide-piece will then obviously, with the construction described, take place only at the end of each complete revolution of the cam-carrying shaft $T^2$. Such rotation is made intermittent and caused to take place at any desired time by the following means and mechanism:

Pivoted at its ends in suitable bearings is the rock-shaft U, to which are attached the rearwardly-extending arms U′ U′, carrying the armatures $U^2$ $U^2$ of the electro-magnets $U^3$ $U^3$. Rigidly attached to and extending up from such shaft is the lever-arm $U^4$, provided near its upper end with the lug or short plate $u$, adapted to engage the periphery of the notched disk $U^5$ on the same shaft with the worm-wheel $T^5$. The notch $u^3$ in this disk is ratchet-shaped, having its abrupt face at its rear side with reference to the direction of rotation of the disk. The upper end of the lever is connected by the pivot-pin $u'$ with the sliding bar $U^6$, supported and guided in its forward and back motion by the screws $u^2$ $u^2$, engaging slots $u^3$ $u^3$ in the bar. These screws are attached to or project from the cross-bar at the upper end of standard $t^2$, from which project the arms in which the fly-shaft is journaled. The forward end of the sliding bar $U^6$ is carried up and then over to one side inward beyond the plane of travel of the outer edges of the fly-fan. Such fan is near its rear end provided with the notch $u^4$ on one side. On the other side it is notched at its rear end, such notch being lettered $u^5$. The notch $u^4$, being near and not at the rear end or edge of the plane, leaves the portion $u^6$ projecting at the corner of the fan. With this construction, the parts being in the position shown in Figs. 2 and 4, with the tooth $u$ on the lever $U^4$ resting in the notch of disk $U^5$, and the bar $U^6$ slid forward so that its end engages the fly-fan at the forward side of notch $u^5$, the fan and so all the connecting mechanism, gearing, and shafts below are held stationary. If, now, a current of electricity be sent from a battery through magnets $U^3$ $U^3$, the armatures $U^2$ will be drawn down and the lever $U^4$ will be thrown back, drawing the bar $U^6$ rearward. The fan is thus released to revolve through one-half a turn, but is then checked, as shown in Fig. 9, by the end of the bar engaging the portion of the fan at the rear of notch $u^4$. While the lever and bar are thus held at their extreme rearward positions, as they are as long as the current passes through the magnets, the tooth or lug $u$ on the lever $U^4$ stands to the rearward of and out of contact with the periphery of disk $U^5$. When the current is switched or cut off from the magnets, the rock-shaft U is rocked by the action of spring $u^7$ on the arm $U^7$, extending forward from the shaft, so that the lug or tooth $u$ on the lever is brought against the periphery of the disk. By such movement of the lever the bar $U^6$ is moved so that its fan-engaging end disengages the portion $u^6$ of the fan, and stands in such position as not to engage the forward side of either of the notches. The fan and connected mechanism are then free to revolve until the notch $u^8$ in the disk comes around to the tooth or lug $u$, allowing the lever $U^4$ to fall forward and carry the stop-bar $U^6$ into position to engage the fan at the forward side of notch $u^5$, as it did in the position of the parts first described.

Fixed on the shaft $T^2$ is the disk or head V, just beyond or on the inner side of the inner standard, $t^2$. This head is provided with one or more pins or studs, $v$, adapted to engage holes $v'$ in head $V'$ on the end of the squared shaft $V^2$, and with a central recess, $v^2$, to receive the central stud or projection, $v^3$, on said shaft. The other end of this shaft, which extends along, as shown, parallel to and in rear of the screw or spiral slide-actuating shaft S, has a central externally-threaded projection or stud, $v^4$, upon which is screwed the disk $V^3$ of greater diameter than the shaft. This stud or projection is also provided with the central recess, $v^5$, which receives the end of the bearing-piece $V^4$, for supporting the shaft. Said pivotal or bearing piece passes through the opening $v^6$ in the standard $V^5$, and is held therein by the set-screw $v^7$.

Upon the squared portion of the shaft $V^2$ are placed the toothed disks $V^6$, whose teeth $V^7$ $V^7$ are adapted to engage and lift the rear end of the arm $S^4$ on the rocking slide-piece on frame when the arm is brought over them by the sliding along of such piece. The teeth on each of these disks are of different radial lengths, as shown, so as to raise the arm different heights as they engage and pass under it with the rotation of shaft $V^2$.

As the rotation of the indicator-drum to bring the different names thereon to the display-opening is dependent upon and regulated by the up and down movements of the arm $S^4$, as already indicated, the various teeth on each disk $V^6$ can obviously be easily made of such lengths as to raise the arm the required distances to bring the names on the drum up to the display-opening in any desired order. Said teeth on a disk can be either made successively longer and longer, so as to cause all the names or marks on the drum to be exhibited successively, or a tooth can be made so much longer than the one preceding it as to cause the drum to rotate so as to display any desired name or mark beyond the one next to that last shown. In other words, the indication by the apparatus may thus be regulated to skip one or more of the names on the drum.

The disks $V^6$ $V^6$ are of such thickness that the slide-piece on the rocking frame is carried by each of its intermittent sliding motions on the shaft into position, so that its arm $S^4$ will be engaged by the teeth on a new disk. As such intermittent motion of the slide-piece takes place, as described hereinbefore, at each complete revolution of the cam-carrying shaft $T^2$, and the square disk-carrying shaft $V^2$ is connected with such shaft so as to rotate therewith, it follows that the slide-piece remains in one position on frame R until the disk, whose teeth engage its arm, has rotated through one complete rotation, and then is moved to the next disk, and so on.

For a purpose to be set forth hereinafter, the teeth $V^7$ on one disk, $V^6$, can be made successively longer and longer in one direction, while the teeth on the next disk beginning at the longest can be made shorter and shorter in the same direction around the disk.

When the indicator-drum shaft B' is free to revolve, it is rotated by the action of the weight $D^3$ and cord $D^2$, so as to turn the drum back to its starting-point again. Such action of the weight $D^3$ and rotation of the shaft causes, through pinion P, segment P', and arm $P^3$, the slide-piece and frame R to rock, so as to carry the arm $S^4$ down into the space between the teeth on the disk opposite or under the arm. In order to make sure of the proper indication being made each time, it is desirable that the indicator-drum should thus return to its starting-point and the arm $S^4$ on the slide-piece should descend to its lowest possible position before each indication—that is, before a new tooth, $V^7$, on a disk, $V^6$, engages the arm. I therefore put the electro-magnets which operate the lever for stopping and starting the fly and the connected mechanism for rotating the disk-carrying shaft $V^2$, and the magnet which serves to swing the pawl-lever O' to release the ratchet on the indicator-shaft in the same circuit or connected circuits, so that the electric current will pass through both at the same time. With this construction, as will be understood from what has been described hereinbefore, the passage of the current causes the fly $t^7$ to be released to make a partial revolution and then to be stopped. In the meantime the pawl-lever O' is caused to release the ratchet on the indicator-shaft, allowing the drum to turn back under the influence of weight $D^3$, and the frame R to be rocked to carry the end of arm $S^4$ down to the bottom of the space just in front of the next tooth, $V^7$, which is to engage the arm end.

To hide the surface of the indicator-drum during the change from one indication to another, and until the change in indication is completely made, I have provided the shutter W, in the shape of a portion of a cylinder concentric with the indicator-drum periphery. This shutter, which moves between the drum-periphery and the drum-casing C', is attached to the swinging arm W', pivoted on the indicator-shaft B' at one side of the drum. For operating this I provide the rock-shaft $W^2$, journaled in bearing-standards $w$ $w$, below the screw-shaft.

The arm $U^7$, which extends forward from the armature-carrying rock-shaft U, is at its forward end provided with a pin, $w'$, which engages the under side of the arm $w^2$ on shaft $W^2$. Attached to this shaft is a second arm, $w^3$, carrying the weight $w^4$, which acts to turn the shaft backward in a direction opposite to that in which the lever would turn it. Extending up from this shaft is a third arm, $W^3$, which carries the pin or screw $W^4$, engaging the slot $W^5$ in the rod $W^6$, pivotally connected with the swinging shutter-carrying arm $W'$. The slot $W^5$ has at its forward end a right-angled bend or upwardly-extending portion or offset, $w^6$, which normally engages the pin $W^4$ during the operation of the machine. The weight of the rod or bar $W^6$ serves to keep this offset normally engaging the pin, as shown.

With the construction as just described, when the current is sent through the magnets $U^3 U^3$ to start the mechanism on its preliminary movement, and through the magnet $O^5$, to cause the pawl-lever to release the indicator-shaft, the arm $U^7$, being raised, rocks the shaft $W^2$ and, moving the bar $W^6$, swings the shutter down into the upper of the two positions shown in dotted lines in Fig. 6, so that it closes the display-opening. As the arm $U^7$ is held in its elevated position by the engagement of the tooth or lug $u$ on lever $U^4$ with the periphery of the disk $U^5$, the rock-shaft remains as turned and the shutter stays closing the display-opening until the mechanism described has made a full change in the indication. When the notch in disk $U^5$ comes around to the tooth or lug, the lever $U^4$ swings forward and the arm $U^7$ descends under the action of the spring attached to a fixed arm on standard $w$, leaving the rock-shaft $W^2$ free to be turned back by weight $w^4$, so as to raise the shutter to disclose the new name or indication on the indicator-drum. As the indication is fully made, it is now the time to print upon the record-strip the indication or mark designating the same, and also the time of making the indication. To do this the following make-and-break device is interposed in the circuit connecting with the battery the printing-lever-actuating magnet:

On top of base A is an insulated plate, X, connected, as shown, with one wire from the battery. The other wire coming from the magnet is connected with the insulated plate $X'$ on the under side of base A. Pivotally connected with such plate and extending up through an opening in the base is the conducting-arm $X^2$, carrying on one side, near its upper end, the inclined lug $x$. Attached to the insulating-block $x'$, upon which plate X is fastened, is the spring $x^2$, engaging arm $X^2$ and adapted to hold it normally in an upright position. Attached to the plate X is the conducting-spring $x^3$, extending past and close to the rear side of arm $X^2$, but held out of contact therewith by the stop $x^4$. On the rear side of the rock-shaft $W^2$ is the arm $w^2$, carrying the pin $X^4$, adapted to engage the lug $x$ as the arm rises and falls with the motion of the shaft. As this arm rises under the action of arm $U^7$ on the shaft, the pin $X^4$ engages the rear inclined side of lug $X^3$ and simply swings the arm $X^2$ away from the spring $x^3$. As the rock-shaft $W^2$ turns back again under the action of weight $w^2$, as it does after a complete indication has been made, the pin $X^4$ engages the forward inclined side of lug $x$ and forces the arm $X^2$ back into contact with contact-spring $x^3$, thus closing the circuit in which is the printing-lever magnet $F^4$. The printing-lever will then be thrown up quickly to cause the printing or type wheels to print on the record-strip $E'$, as set forth hereinbefore. To throw the apparatus out of operation and allow the shutter to fall low enough to indicate that the machine has stopped when all the possible indications have been made, I provide the following means:

Upon the base A, in front and at the left-hand end of the screw shaft S, for moving the slide-piece along frame R, is the insulating plate or block Y. Upon this block is the post $Y'$, having pivoted in its upper end the angle or elbow lever $Y^2$, whose upright arm $y$ is situated in the track of the arm $S^3$ of the slide-piece, so as to be struck and moved outward by such arm as the slide-piece reaches the limit of its motion along the rocking frame. The other or horizontal arm, $y'$, of this lever projects inward under the bar $W^6$, which operates the shutter. As the upright arm $y$ is carried outward, as described above, by the travel of the slide-piece, the arm $y'$ will then rise and lift the rear end of the bar $W^6$, so that the upper bend or offset, $w^6$, in the slot in such bar passes out of engagement with the pin or screw on the rock shaft arm $W^3$. The bar is then free to slide forward, as the main part of slot $W^5$ is in line with the pin $W^4$. The shutter of its own weight falls to the lowest position indicated in Fig. 6, where it is stopped by pin $w^7$, striking the bar $W^6$.

It is my intention to mark on the part of the shutter now shown through the display-opening the word "Closed," or other words to indicate the end of the route or of the series of indications.

When the apparatus is to be put in operation again and the lever $Y^2$ is moved to lower its arm $y'$, the bar can be easily slid rearward again, so that the offset in its slot will again engage the pin or screw $W^4$.

To secure the breaking of the battery-circuit when the apparatus has reached the end of its indications, I provide the arm $y'$ of lever $Y^2$ with the wedge-shaped block $y^2$ of non-conducting material.

Extending up from conducting-plates $y^3 y^3$ on insulating-block Y are the two conducting-springs, $Y^3 Y^3$, whose upper ends, situated on opposite sides of the wedge $y^2$ on lever $Y^2$, are adapted to be engaged and pressed outward by such wedge as the arm $y'$ of the lever descends, as indicated in Fig. 6. Extending up from other conducting-plates, $y^4 y^4$, on block Y are the contact-springs $Y^4 Y^4$, in position to be engaged by the upper ends of the respective contact-springs $Y^3 Y^3$ when the latter are pressed and held outward, as described, by the block or wedge $y^2$ on the lever $Y^2$. When the lever is moved to raise this block out of engagement with springs $Y^3 Y^3$, the upper ends of the latter spring inward to break contact with springs $Y^4 Y^4$, and so disconnect electrically the respective pairs of plates $y^3 y^4$ and $y^3$ and $y^4$.

The circuits whereby the battery and the various electro-magnets are connected with the make-and-break devices are as follows: On the under side of base A are the four insulated plates, $Z Z' Z^2 Z^3$, of conducting material, each provided with the two binding-screws $z z'$, for connecting the circuit-wires with the plates. Of these plates the ones designated by $Z Z'$ are connected by wires 1 1 with the same pole of battery N, while the other plates are connected with the other pole of the battery by wires 2 2. From plate Z a wire, 3, extends to the connected electro-magnets $U^3 U^3$, and from them extends the conductor 4 to the magnet $O^5$, for actuating the pawl-lever $O'$ to release the indicator-drum shaft. From this magnet the return-wire 5 is connected with one of the conducting-plates $Y^4$ with its contact-spring $Y^5$. The corresponding plate $y^3$, whose spring-arm $Y^3$ is adapted to be brought into contact with the contact-spring $Y^5$, just referred to, is connected by wire 6 with plate $Z^2$, which, as described, is connected with the pole of battery N opposite to that with which the plate Z is connected.

In the portion of the circuit between plate $Z^2$ and the battery I interpose a make-and-break device, by which the circuit can be closed or broken at intervals, as desired. In the drawings I have shown such device at $Z^4$ in the form of any ordinary push-button; but I do not intend to limit myself to such construction.

Any form of device for making and breaking the circuit at intervals or for keeping it made for a time and then breaking it can be used, as desired, without departure from my invention.

From plate $Z'$ a conductor, 7, runs to the contact-spring $x^3$, and from the arm $X^2$ the conductor 8 runs to the connected electro-magnets $F^4 F^4$, which actuate the printing-lever. From these magnets a wire, 9, runs to one of the pair of contact spring plates $Y^3 Y^4$, not connected with the other circuit, while from the plate of such pair the wire 10 runs to plate $Z^3$. Plates $Z'$ and $Z^3$ are connected, as described, by wires 1 and 2 with opposite poles of the battery. In this circuit I interpose no make-and-break device, as in the portion of the circuit between plate $Z^2$ and the battery. With the circuits thus arranged, and with the lever-arm $y'$ depressed so as to cause the wedge-block to force the contact-springs $Y^3 Y^3$ on each side of it over into contact with conducting-springs $Y^4 Y^4$, a current can obviously be sent at any time through the circuit, in which are magnets $U^3 U^3 O^5$, by closing the circuit by the make-and-break device indicated at $Z^4$. Likewise, when the arm $X^2$ is brought into contact with spring $x^3$, a circuit is closed or established from the battery through the printing-magnets.

As it may be desired at times to throw the apparatus out of action before it has run down, and to swing the shutter down to its lowest point to denote or indicate that the indications are stopped or closed, I provide the push pin or bar $Z^5$, connected with the short elbow-lever $Z^6$, pivoted to the stud $Z^7$ under base A. The other arm of this lever $Z^6$ is connected by link or bar $Z^8$ with the arm $y'$ of the lever $Y^2$. With this construction, upon pushing in the head $Z^9$ on push-bar $Z^5$, the lever-arm $y'$ will be raised, tripping the bar $W^6$ from pin $W^4$, so that the shutter falls into its lowest position, and lifting wedge-block $y^2$ from between contact-springs $Y^3 Y^3$, so that they fly inward out of contact with their respective contact-springs $Y^4 Y^4$, thus breaking both the magnet-circuits. The circuits can be made or re-established, as desired, by simply pulling the push-bar out again, thus drawing the arm down again into its previous position.

To limit the upward throw of the swinging segment-carrying arm $T^7$, I provide on the side of such arm at the lower end of the segment the lug $t^{18}$, and on the standard $S'$, I place the stop-pin $t^{19}$ in position to engage such lug. Instead of this construction, I contemplate, if desired, placing a stop-pin on the shaft itself, which will come in contact with the lug on the segment-arm when the segment rises; and the shaft is turned thereby the proper amount.

At $Z^{10}$ is shown a shield or cover, which covers the back and top of the series of toothed disks $V^7 V^7$ on the shaft $V^2$. The upper portion of this shield is above and extends forward over the arm $S^4$ of the slide-piece, so as to allow such arm to rise and fall and move along under it. The said shield can be supported from the base A in various ways; but I prefer to hinge it to standard $V^5$ by means of the pin $Z^{11}$, passing through the lug $Z^{12}$ on the shield end and into stud $Z^{13}$ on the standard.

In front of the shaft $V^2$ and disks $V^7 V^7$ thereon is the stationary shield $Z^{14}$, extending upward from base A, and then inward or rearward under the forward portion of shield $Z^{10}$ and below the path of arm $S^4$.

The operation of my apparatus is as follows: The toothed disks having been placed on shaft $V^2$, so that the teeth thereon will engage arm $S^4$ on the slide-piece in the proper order, and the parts being in the positions shown in Figs. 2, 3, and 4, if the make-and-break device—indicated, for instance, at $Z^4$ in Fig. 5—be caused to complete or close the circuit in which it is placed, the current passes through the magnets $U^3 U^3$ and $O^5$. The former magnets, attracting armatures $U^2 U^2$, swing the lever $U^4$ outward or rearward, thus allowing the fly-fan, with the connected mechanism, to make a partial turn, as set forth clearly hereinbefore. By the action of arm $V^7$, raised by the moving of said armatures, the rock-shaft $W^2$ is, through the connections described, rocked to lower the shutter W to close the display-opening. The magnet, attracting the armature on pawl-lever $O'$, causes such lever to release the indicator-drum shaft and allow the same, with the drum, to be turned back to their starting-point by the action of weight $D^3$ and cord $D^2$. This turning back of the indicator-shaft causes the segment-bearing end of arm $P^2$ to rise, thus rocking the frame U, to carry the end of arm $S^4$ on the slide-piece down into contact with the bottom of the space between the tooth $V^7$ on the disk which last engaged it and the following tooth. At the breaking of the circuit by the make-and-break device the lever $U^4$ falls forward until its tooth or lug $u$ strikes the periphery of disk $U^5$. The fly and all the connected mechanism is thus left free to revolve. As, however, the lug $u$ is held back by the periphery of the disk $U^5$ until a complete revolution of the disk has been made, the arm $U^7$ remains raised, holding the rock-shaft $W^2$ and the connected shutter W in the positions above described. Upon the releasing of the fly or fan, and consequent rotation of the connected mechanism, the shaft is rotated through the distance of one tooth on the disk $V^6$, engaging arm $S^4$. This arm is raised by the tooth thus passed under it a distance dependent upon the height or length of the tooth, causing, through the connecting mechanism, the indicator-drum shaft to be rotated, so as to bring a certain predetermined name or mark on the drum opposite the display-opening in the drum-casing. When the disk $U^5$ has rotated to bring notch $u^8$ in it around to lug $u$ on the lever $U^4$, such lever falls forward and the arm $U^7$ drops under influence of spring $u^7$, thus disengaging the arm $w^2$ on shaft $W^2$, and allowing the rock-shaft to be rotated backward by the weight $w^4$. By this motion of the shaft the shutter is raised to show the name or mark on the drum just brought to the display-opening, and the pin $X^4$ on arm $w^2$ is caused to engage the inclined lug $x$ and force the contact-arm $X^2$ into contact with spring $x^3$. The circuit is thus established from the battery through the printing-magnets $F^4 F^4$, until the pin $X^4$ passes down off of the lug and lets the arm $X^2$ fly back out of contact with the spring $x^3$. The printing-lever F is, by the attraction of the magnets $F^4$ on their armatures, thrown up to cause the type or printing wheels E, $G^2$, and $G^3$ to print on the record strip or ribbon, as hereinbefore fully described, the name or indication corresponding with the name or indication showing on the indicator-drum, and also the time of the indication. Upon the breaking of the circuit the printing-lever falls and swings the pawl M, so as to allow the feed-wheel I to rotate far enough to feed the ribbon strip the necessary distance for receiving a new print or record.

The manner and means of shifting the slide-piece along the rocking frame at the proper intervals to bring the arm $S^4$ on such piece successively over the various toothed disks, of causing the shutter to drop and indicate closing of the indications, and of causing both the electric circuits to be broken and remain broken when the slide-piece has reached the end of its travel, I have described fully hereinbefore, and therefore need not set forth in this place.

The teeth on any of the disks can obviously be made of such lengths as to cause the indications on the drum to be made in any desired order. The disks can, moreover, be easily taken off of their supporting-shaft and replaced or changed, as desired. Upon unscrewing the set screw $v^7$ the bearing-piece $V^4$ can be drawn out to release the shaft end, and the shaft can be removed from its bearing at the other end in rotary head V. Upon this removal of the shaft the disk or head $V^3$ can be unscrewed and the disks be slid off of the shaft. They can then be turned, interchanged, or replaced by others, as desired. A further change of the position of the series of teeth on the disks $V^6$ with reference to the arm $S^4$ of the slide-piece can be made by turning the shaft before replacing it in its bearings, so that the stud $V^7$ on head V will engage a different one of the holes $v' v'$ in the disk or head $V'$, fixed to the shaft.

The winding mechanism has been already fully described in its construction and operation.

It is proposed to furnish some kind of receptacle for receiving and keeping the record-strip for inspection. With my apparatus, as described, the names of all the stations on a road being marked on the indicator-drum and properly indicated on the printing-wheel E, and the teeth on the disks $V^6 V^6$ being properly arranged, all that the conductor or operator has to do is to operate the push-button or make-and-break device as each station is reached. The apparatus will then automatically display the name of the next station, and will also record on the ribbon or strip the indication and the time that it was made. The record-strip will then, when afterward examined, show not only that the conductor or operator caused the apparatus to show the names of the stations in their proper order, but also the time at which the indications were made. It being made the rule to change the indications upon arrival at or departure from a station, the record will also show if the train reached the station at the proper or schedule time. Enough disks can be placed on the shaft to last through many trips. My apparatus can be set at the beginning of a series of trips, so that the conductor can take his orders from the apparatus itself as to where or at what stations he must stop on any trip. The disks having been arranged properly by the official in charge of the schedule directions, the conductor could always ascertain where he was next to stop by operating the make-and-break device.

The apparatus can of course be closed in a case to be locked and capable of being opened only by the proper official.

Having thus described my invention, what I claim is—

1. In combination with the rotary indicator-drum and the printing-wheel provided with a series of means for making marks corresponding with the indications on the drum, the time-printing wheels beside and concentric with the printing-wheel and the time mechanism connected with such wheels to drive them, substantially as and for the purpose set forth.

2. In combination with the indicator-drum and the printing-wheel E, rotating therewith, the hour-and-minute-printing time-wheels close beside wheel E, and driven by suitable connections with a time-train, and a suitable striking device adapted to bring a record-strip up against the type on the wheels, substantially as and for the purpose described.

3. In combination with the indicator-drum and the printing-wheel E, the hour and minute wheels provided with means for printing the numbers of the hours and minutes, respectively, the time mechanism connected by gearing with the minute-wheel, and connecting mechanism between the hour and minute wheels, whereby the hour-wheel is turned step by step as the minute-wheel completes its revolution, substantially as and for the purpose specified.

4. In combination with the minute and hour printing-wheels, the latter provided with teeth, and the time-train for driving the minute-wheel continuously, the cam revolving with the minute-wheel, the pivoted lever provided with the cam-engaging arm, the spring-pawl engaging the teeth on the hour-wheel, the lug $g^8$ on the lever, and the spring $g^6$, substantially as and for the purpose set forth.

5. In combination with printing-wheel E, the time-printing wheels $G^2$ and $G^3$, close beside and concentric with the wheel E, the time mechanism connected by gearing with wheel $G^3$, the cam turning with such wheel, the swinging lever provided with arm $g^7$ and lug $g^8$, the pawl adapted to engage teeth on wheel G, and the springs $g^5$ and $g^6$, all substantially as and for the purpose described.

6. In combination with the feed-wheel provided with the series of pins, the printing-lever, the double pawl M, and the link connecting the pawl with the lever, substantially as and for the purpose described.

7. In combination with the feed-wheel provided with the series of pins, the pawl M, provided with the two alternately-acting arms for engaging the pins, the printing-lever, and connections between the pawl and the lever, substantially as and for the purpose specified.

8. In combination with the feed-wheel provided with the series of pins and means for rotating it, the pawl M, provided with arm $m$ and arm $m'$, having shoulder $m^2$, the printing-lever, and the link connecting the lever with the pawl, substantially as and for the purpose shown.

9. As a means for rotating the winding-shafts L' and K' together and then disconnecting them, the shaft $L^4$, the pinion on the shaft in mesh with a pinion on shaft L', the pinion $l^3$ on shaft $L^4$, near shaft K', and the sliding pinion on shaft K', adapted to be moved into and out of engagement with pinion $l^3$, the spring $l^8$, and the key adapted to engage and move the pinion $l^4$ along the shaft, substantially as and for the purpose set forth.

10. In combination with shaft K' and shaft $L^4$, the pinion fixed on the latter shaft, the sliding pinion on shaft K', the spring $l^8$, and the key fitting an angular portion of the shaft and engaging the pinion or a hub thereon, substantially as and for the purpose described.

11. In combination with the shaft $L^4$ and pinion thereon, the shaft K', having the angular key-receiving portion, the sliding pinion on the latter shaft having a hub adapted to project out over the angular portion of the shaft when the pinion is out of mesh with the pinion on shaft $L^4$, the spring for holding the sliding pinion in such position, and the key adapted to engage the hub on the pinion and move it inward on the shaft, substantially as and for the purpose specified.

12. In combination with the shaft K', having the angular key portion and the screw stud or projection on its end, the sliding pinion having the hub $l^5$, the spring $l^8$, the key $L^3$, and the screw-piece therein, adapted to engage the screw-stud on the shaft, substantially as and for the purpose shown.

13. In combination with the shaft K', having the angular portion and screw projection, the sliding pinion having hub $l^5$, the spring $l^8$, the key $L^3$, the rotary piece $L^5$ in the key, having the circumferential groove $l^{13}$ and the threaded recess $l^{10}$, and the set-screw $l^{12}$, substantially as and for the purpose set forth.

14. In combination with the indicator-drum and means for turning it, the shutter adapted to close the display-opening and means for causing it to close the opening while the drum is being moved and then to unclose it again, substantially as and for the purpose shown.

15. In combination with the swinging arm carrying the shutter, the rock-shaft, the arm thereon, and the link or bar pivotally connected with this arm and the shutter-carrying arm, substantially as and for the purpose set forth.

16. In combination with the shutter and the swinging arm carrying it, the rock-shaft, the weighted arm thereon, the crank-arm on the shaft, and the connecting-rod connecting such arm with the shutter-carrying arm, substantially as and for the purpose described.

17. In combination with the shutter-carrying arm, the rock-shaft, the arm on the rock-shaft, the pin on the latter arm, the bar provided with a slot engaging the pin, and a pivotal connection between the bar and the shutter-carrying arm, substantially as and for the purpose specified.

18. In combination with the shutter-carrying arm, the bar connected therewith and having the longitudinal slot with the offset therein, the rock-shaft, the arm thereon having the pin engaging the offset in the slot, and means for raising the bar to disengage the offset from the pin, substantially as and for the purpose shown.

19. In combination with the swinging arm and the shutter carried thereby, the rod or bar connected with such arm and provided with the longitudinal slot with the upward bend or offset, the rock-shaft, the arm thereon carrying the pin normally engaging the offset in the slot in the bar, and a lever adapted to lift the slotted end of the bar, substantially as and for the purpose set forth.

20. In combination with the display-opening, the swinging shutter for closing the same, the arm carrying the shutter, provided with the pin $w^7$, the bar $W^6$, provided with the slot having the upward bend or offset, the rock-shaft, the arm thereon provided with the pin normally engaging the offset in the slot, and the lever adapted to raise the slotted end of the bar, substantially as and for the purpose described.

21. In combination with the indicator-drum and casing with the display-opening, the means for turning the drum, a stopping and starting mechanism for the drum-turning means, the swinging shutter, and means connected with the stopping and starting devices, whereby the shutter is caused to close the display-opening during movements of the drum, substantially as and for the purpose specified.

22. In combination with the stopping and starting devices for the drum-operating mechanism and the shutter, means for closing the latter as the drum-operating mechanism is started, substantially as and for the purpose shown.

23. In combination with the arm U', rigidly connected with the stopping and starting lever $U^4$, the pin on such arm, the rock-shaft $W^2$, the arm $w^2$ on the shaft, the pin on the arm, and the make-and-break device adapted to be operated by such pin, substantially as and for the purpose described.

24. In combination with rock-shaft $W^2$, the arm $w^2$, and pin $X^4$, the swinging arm connected with one wire of the printing-circuit and provided with the inclined lug $x$, and the contact spring or arm $x^3$, connected with the other wire of said circuit, substantially as and for the purpose specified.

25. In combination with the rock-shaft and means for turning it backward, the arm rigidly connected with the starting and stopping lever for the indicating mechanism, means whereby such arm turns the shaft forward as the starting-lever is moved into starting position, the arm on the shaft, and a make-and-break device in the printing-circuit adapted to be operated to close the circuit as the shaft turns back, substantially as and for the purpose specified.

26. In combination with lever-arm U', having pin $w'$, the rock-shaft, the arm $w^2$ thereon, carrying a pin, the swinging contact-arm $X^2$, provided with lug $x$, the contact spring or bar $x^3$ in the printing-circuit, and the weighted arm on the shaft, substantially as and for the purpose set forth.

27. In combination with the contact-spring $x^3$, connected with one wire of the circuit, the swinging arm $X^2$, connected with the other wire, the spring holding such arm normally out of contact with the spring $x^3$, the lug $x$ on arm $X^2$, inclined on its upper and lower sides, and the swinging arm $w^2$, provided with pin $X^4$, substantially as and for the purpose described.

28. In combination with the indicator-drum shaft and the arm connected with the shaft, so as to turn the same, means for swinging such arm different distances, so as to turn the indicator-drum, substantially as and for the purpose shown.

29. In combination with the indicator-drum and the swinging arm connected with the shaft, so as to turn the same, a second arm moving with such swinging arm, and a rotary disk provided with portions of different diameters to ride under said second arm, substantially as and for the purpose set forth.

30. In combination with the indicator-drum shaft and the arm connected therewith, so as to turn the same, the second arm swinging with such shaft turning arm, and a toothed disk having teeth of different lengths to engage said second arm, substantially as and for the purpose described.

31. In combination with the indicator-drum shaft and the pinion thereon, the swinging arm, the toothed disk for engaging the same, and the arm swinging with such arm and provided with a toothed segment meshing with the pinion on the drum-shaft, substantially as and for the purpose specified.

32. In combination with the indicator-drum shaft and the weighted cord attached thereto, the pinion on the shaft, a rotary disk having teeth of different lengths, the swinging arm engaging such disk, and the arm swinging with such arm, carrying a toothed segment meshing with the pinion on the drum-shaft, substantially as and for the purpose shown.

33. In combination with the indicator-drum shaft, the arm connected therewith, so as to turn it, the rocking frame with which such arm is rigidly connected, the slide-piece on such frame, two or more rotary toothed disks adapted to engage an arm on the slide-piece, and means for moving the slide-piece along the frame to change the arm on such piece from one disk to the other, substantially as and for the purpose set forth.

34. In combination with the series of rotary toothed disks, the pivoted frame and the slide-piece thereon, provided with an arm adapted to be brought into position to be engaged by the teeth on any of the disks by sliding the slide-piece along the frame, substantially as and for the purpose described.

35. In combination with the shaft B' and the pinion thereon, the cord attached to the shaft, the weight on the cord, the swinging arm provided with the toothed segment, the arm swinging with such arm, and a rotary toothed disk with teeth of different lengths, substantially as and for the purpose specified.

36. In combination with the swinging arm P³, the rocking frame, the series of rotary toothed disks, and the slide-piece on the frame provided with an arm adapted to be engaged by the teeth on the disks, substantially as and for the purpose shown.

37. In combination with the rocking frame and the rotary shaft parallel with the same, the series of toothed disks on the shaft and the slide-piece on the frame provided with an arm for engaging the disks, substantially as and for the purpose set forth.

38. In combination with the rotary shaft and means for rotating it, the series of toothed disks on the shaft, the rocking frame, the slide-piece thereon provided with the disk-engaging arm, and means for moving the slide-piece along the frame from one disk to the other, substantially as and for the purpose described.

39. In combination with the rotary series of toothed disks and means for rotating them, the rocking frame, the slide-piece thereon provided with the disk-engaging arm, and means for moving the slide intermittingly along the frame to bring it opposite the several disks successively, substantially as and for the purpose specified.

40. In combination with the rocking frame and the slide-piece thereon, the rotary screw engaged by one or more teeth or lugs carried by the slide-piece and means for intermittingly rotating the screw, substantially as and for the purpose shown.

41. In combination with the rocking frame, the slide-piece guided thereon and rocking therewith, the rotary screw, and one or more pins or lugs carried by the slide-piece, engaging the thread of the screw, substantially as and for the purpose set forth.

42. In combination with the rotary screw and the rocking frame, the slide-piece on the frame, the spring-plate on the slide-piece, and one or more pins on such plate engaging the threads of the shaft, substantially as and for the purpose described.

43. In combination with the screw-shaft and the frame pivoted to rock about such shaft as an axis, the slide-piece guided and sliding on the frame and having a portion embracing the shaft and the spring-plate on the slide-piece provided with one or more pins to engage the thread on the shaft, substantially as and for the purpose specified.

44. In combination with the screw-shaft and the pinion, pawl-and-ratchet connections between the shaft and pinion, the swinging arm carrying the toothed segment, and means for swinging such arm alternately in opposite directions, substantially as and for the purpose shown.

45. In combination with the rotary shaft carrying the toothed disks, the rocking frame and the slide-piece thereon, the screw-shaft connected with the slide-piece, the pinion, the pawl-and-ratchet connections between the shaft and the pinion, the swinging segment-carrying lever, the cam rotating with the disk-bearing shaft, and the spring connected with the lever, substantially as and for the purpose specified.

46. In combination with the rotary head V, provided with the central socket and stud, $v$, the shaft having the bearing portion entering the socket, the head fixed on the shaft, provided with one or more holes to engage the stud $v$, a movable bearing-piece engaging a socket in the end of the shaft opposite to the fixed head, and a set-screw to fasten the bearing-piece in place, substantially as and for the purpose described.

47. In combination with the stopping and starting lever U⁴, the sliding bar U⁶ connected with the lever and provided with the lug or projection on this bar, and the fly-fan provided on one side with the notch $u^4$ on one side near the end of the fan, and with the notch $u^5$ on the other side, partially out of line with the other notch, substantially as and for the purpose specified.

48. In combination with the rotary fly-fan, provided on one side with a notch near one end and on the other side with a notch at such end, the sliding bar provided with the projection extending in beyond the plane of travel of the fan side, substantially as and for the purpose shown.

49. In combination with lever U⁴ and the sliding bar U⁶, provided with the projecting portion, the regulating-fan provided with the notches $u^4$ $u^5$, the fan-driving wheel connected with the fan-shaft so as to rotate it, the disk U⁵, rotating with such wheel and provided with the notch $u^8$, and the tooth or lug on lever U⁴, substantially as and for the purpose shown.

50. In combination with the fly-fan provided with notches $u^4$ $u^5$, the fan-shaft, the worm on the same, the worm-wheel, the disk U⁵, rotating with the wheel and provided with notch $u^8$, the lever U⁴, provided with lug $u$, the sliding bar $u^6$, provided with the projecting portion to engage the fan, and a pivotal connection between the lever and the bar, all combined and acting substantially as and for the purpose described.

51. In combination with the slide-piece and the rotary screw connected with the same, so as to slide it along, the shutter-operating bar W⁶ and the elbow-lever Y², substantially as and for the purpose specified.

52. In combination with the shutter-working bar W⁶, provided with the slot having the upward offset or bend $w^6$, the bar-actuating arm, the pin on such arm, and the lever for raising the bar end, having the upwardly-extending arm, and the slide-piece adapted to strike such arm as it reaches the end of its travel, substantially as and for the purpose shown.

53. In combination with the slide-piece of the indicating apparatus and the electric circuits for starting the apparatus and actuating its parts, a make-and-break device adapted to be operated to break such circuits by the slide-piece as it reaches the end of its travel, substantially as and for the purpose set forth.

54. In combination with the indicating mechanism and the electric circuits thereof, the two pairs of contact devices in the two respective circuits and the lever $Y^2$, with the wedge-block $y^2$, substantially as and for the purpose described.

55. In combination with the indicating mechanism and the slide-piece thereof, the pairs of contact springs $Y^3$ $Y^4$ $Y^3$ $Y^4$, interposed in the two circuits and tending to stand normally out of contact with each other, and the elbow-lever $Y^2$, having the wedge-block adapted to engage the springs $Y^3$ $Y^3$ of the pairs and force them into contact with the corresponding springs $Y^4$ $Y^4$, substantially as and for the purpose specified.

56. In combination with the two contact devices in the two circuits and the slotted shutter-actuating bar, the lever-arm $Y'$, the wedge-block thereon, the push-piece, the pivoted elbow-lever, and the link connecting an arm of such lever with arm $Y'$, substantially as and for the purpose shown.

57. In combination with the stopping and starting lever for the indicator mechanism and the pawl-lever $O'$, the ratchet-wheel on the indicator-drum shaft, armatures on or connected with the two levers, electro-magnets for such armatures connected together in the same circuit, and a make-and-break device for the circuit, substantially as and for the purpose set forth.

58. In combination with the indicator-drum, means for automatically turning it back to its starting-point, the mechanism for turning the drum forward, stopping and starting devices for such mechanism, adapted to allow the mechanism a certain preliminary motion, then to stop it, and then to start it again for its full movement, and means for holding the drum from backward rotation, adapted to allow such rotation of the drum only during the preliminary movement of the drum-actuating devices, all substantially as and for the purpose described.

In testimony that I claim the foregoing I have hereunto set my hand this 3d day of December, 1886.

WILLARD D. DOREMUS.

Witnesses:
M. DORIAN,
HENRY C. HAZARD.